US009759162B1

(12) United States Patent
Graham et al.

(10) Patent No.: US 9,759,162 B1
(45) Date of Patent: Sep. 12, 2017

(54) CONTROLLED AUTOIGNITION PROPELLANT SYSTEMS

(75) Inventors: Kenneth J. Graham, Warrenton, VA (US); Edna M. Grove, Chester Gap, VA (US); Robert D. Lynch, Warrenton, VA (US); Guy B. Spear, Orlean, VA (US)

(73) Assignee: AEROJET-GENERAL CORPORATION, Rancho Cordova, CA (US)

( * ) Notice: Subject to any disclaimer, the term of this patent is extended or adjusted under 35 U.S.C. 154(b) by 3844 days.

(21) Appl. No.: 10/200,597

(22) Filed: Jul. 23, 2002

(51) Int. Cl.
*F02K 9/95* (2006.01)
*F02K 9/12* (2006.01)
*F02K 9/14* (2006.01)
*F02K 9/08* (2006.01)
*F02K 9/28* (2006.01)
*C06B 45/10* (2006.01)

(52) U.S. Cl.
CPC .............. *F02K 9/95* (2013.01); *C06B 45/10* (2013.01); *F02K 9/08* (2013.01); *F02K 9/12* (2013.01); *F02K 9/14* (2013.01); *F02K 9/28* (2013.01)

(58) Field of Classification Search
CPC ..... F02K 9/08; F02K 9/12; F02K 9/14; F02K 9/28; F02K 9/95; C06B 45/10
USPC ....... 149/19.1, 19.6, 19.9; 102/205, 286–288
See application file for complete search history.

(56) References Cited

U.S. PATENT DOCUMENTS

| | | | |
|---|---|---|---|
| 3,052,092 A | 9/1962 | Kirkbridge | 60/35.6 |
| 3,585,799 A | 6/1971 | Geschwentner et al. | 60/250 |
| 3,826,087 A * | 7/1974 | McDonald | 60/200.1 |
| 3,837,940 A * | 9/1974 | Spenadel et al. | 149/19.3 |
| 4,148,187 A | 4/1979 | Younkin | 60/245 |
| 4,283,237 A * | 8/1981 | Reed et al. | 149/19.91 |
| 4,441,312 A | 4/1984 | Smith | 60/245 |
| 4,597,811 A * | 7/1986 | Ducote | 149/19.4 |
| 4,756,251 A | 7/1988 | Hightower et al. | 102/289 |
| 4,891,938 A | 1/1990 | Nagy et al. | 60/245 |
| 4,999,997 A * | 3/1991 | Grosgebauer et al. | 102/290 |
| 5,537,815 A | 7/1996 | Marguet et al. | 60/224 |

(Continued)

OTHER PUBLICATIONS

Olds, ARS Journal, "Optimum Proportioning of Two Propellants to Obtain Maximum Burnt Velocity", Aug. 1959, vol. 29, No. 8, pp. 598-600.*

*Primary Examiner* — Ehud Gartenberg
*Assistant Examiner* — Lorne Meade
(74) *Attorney, Agent, or Firm* — Nixon & Vanderhye, P.C.

(57) ABSTRACT

Solid propellant systems include a main propellant and a secondary propellant in contact with the first propellant that exhibits autoignition temperatures of at least about 100° F. lower than the autoignition temperature of the main propellant. The secondary propellant of the present invention is most advantageously employed with conventional AP-containing solid propellant formulations as the main propellant, especially formulations containing both AP, an energetic solid, and a binder. In especially preferred forms, the secondary propellant will include a nitramine which is at least one selected from nitroguanidine (NQ), cyclotrimethylene trinitramine (RDX) and cyclotetramethylenetetranitramine (HMX), and a binder which is at least one selected from HTPB, HTPE or glycidyl azide polymer (GAP). Most preferably, the secondary propellant will include a combination of nitramines which includes NQ and one of RDX or HMX.

7 Claims, 1 Drawing Sheet

(56) References Cited

U.S. PATENT DOCUMENTS

| | | | |
|---|---|---|---|
| 5,623,121 A | | 4/1997 | Schedlbauer |
| 5,711,546 A | * | 1/1998 | Hamilton et al. ............ 280/736 |
| 5,712,445 A | * | 1/1998 | Kassuelke et al. ........... 102/288 |
| 5,759,458 A | * | 6/1998 | Haaland et al. ............... 264/3.3 |
| 5,861,571 A | * | 1/1999 | Scheffee et al. ............. 102/288 |
| 5,886,289 A | | 3/1999 | Nixon et al. .................. 102/490 |
| 5,936,195 A | * | 8/1999 | Wheatley .................... 149/19.91 |
| H1824 H | | 12/1999 | Johnsen et al. ............. 427/255.6 |
| 6,051,087 A | | 4/2000 | Hutchens et al. ............. 149/19.4 |
| 6,062,142 A | * | 5/2000 | Scheffee ........................ 102/288 |
| 6,143,103 A | * | 11/2000 | Ryder ........................... 149/19.6 |
| 6,298,784 B1 | * | 10/2001 | Knowlton et al. ............. 102/205 |

\* cited by examiner

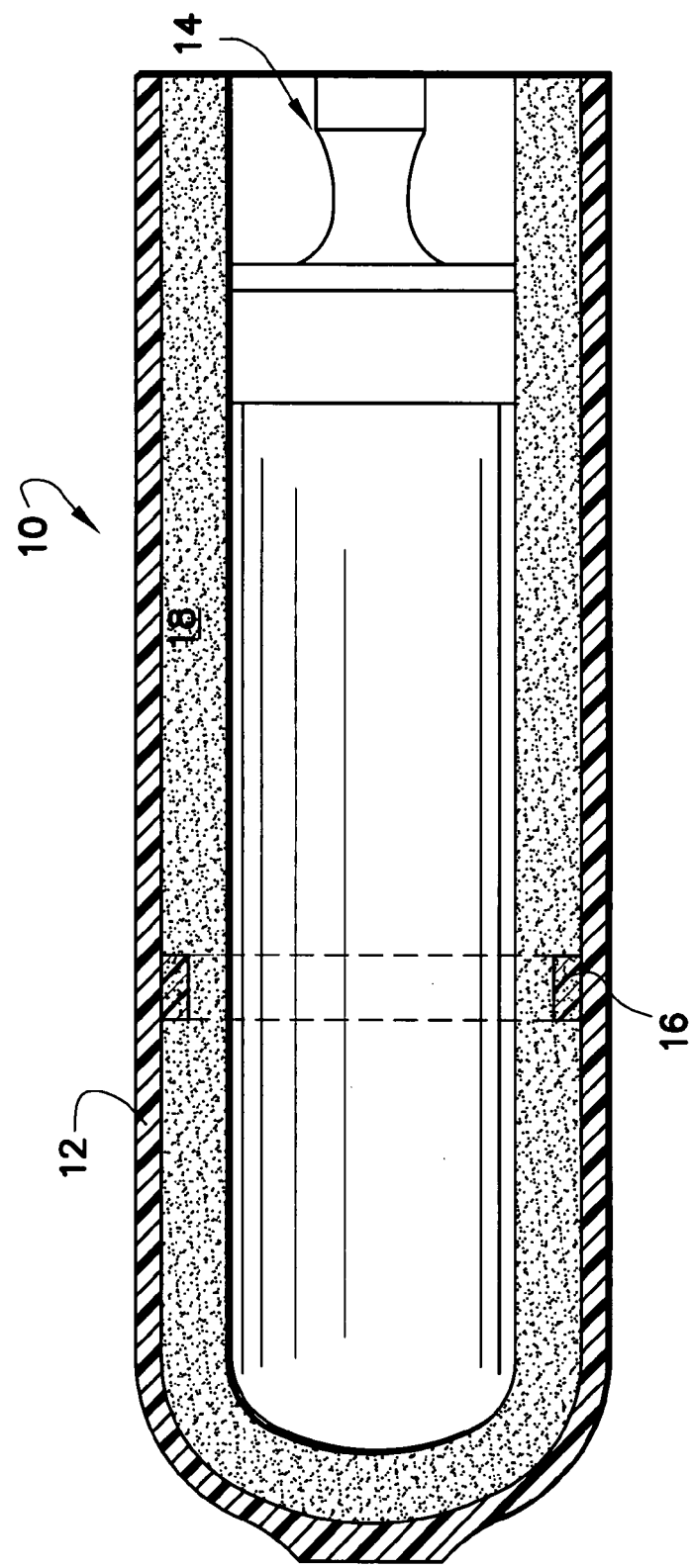

CONTROLLED AUTOIGNITION PROPELLANT SYSTEMS

FIELD OF THE INVENTION

The present invention relates generally to solid propellants usefully employed in rocket motors. In especially preferred forms, the present invention is related to propellant systems having controlled autoignition characteristics.

BACKGROUND AND SUMMARY OF THE INVENTION

Typical solid propellants for rocket motors contain ammonium perchlorate (AP) and sometimes aluminum powder in a rubbery matrix, typically of hydroxyl-terminated polybutadiene (HTPB). The autoignition temperature of these propellants is controlled by the decomposition of ammonium perchlorate and the interactions of the decomposition products with the rubbery binder, that lead to porosity in the propellant grain. When autoignition finally occurs, around 450° F., the high surface area of the porous propellant causes rapid overpressurization in the rocket motor leading to destruction.

Conventional techniques to control autoignition of solid rocket motor propellants has included depositing a uniform, thin coating of a paraxylene polymer over the propellant grain as an ignition inhibitor as disclosed in U.S. Statutory Invention Registration No. H1,824 to Johnsen et al (the entire content of which is expressly incorporated hereinto by reference). U.S. Pat. No. 3,052,092 to Kirkbride (the entire content of which is expressly incorporated hereinto by reference) discloses a second propellant enclosing a first propellant to act, in effect, as a barrier between the first propellant and the motor casing. The second propellant has a suitable burning rate that is lower than that of the first propellant.

Broadly, the present invention is embodied in solid propellant systems that include a main propellant and a secondary propellant in contact with the first propellant that exhibits autoignition temperatures of at least about 100° F. lower than the autoignition temperature of the main propellant. The secondary propellant of the present invention is most advantageously employed with conventional AP-containing solid propellant formulations as the main propellant, especially formulations containing both AP (an energetic solid) mixed with a compatible binder. In especially preferred forms of the present invention, the secondary propellant will include a nitramine which is at least one selected from nitroguanidine (NQ), cyclotrimethylene trinitramine (RDX) and cyclotetramethylenetetranitramine (HMX), and a binder which is at least one selected from HTPB, hydroxyl-terminated polyethylene (HTPE) or glycidyl azide polymer (GAP). Most preferably, the secondary propellant will include a combination of nitramines which includes NQ and one of RDX or HMX.

The secondary propellant is most preferably in physical contact with a localized region of the main propellant near the motor casing. In this regard, most preferably the secondary propellant is in the form of a relatively narrow (i.e., as measured in the elongate axis of the motor casing) strip or ring circumferentially positioned near the motor casing wall in contact with the main propellant. The localized positioning of the strip of secondary propellant provides a critical mass such that heat generation exceeds heat losses. As such, reaction violence is dramatically reduced since the main propellant is not significantly decomposed when the secondary propellant autoignites.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawing FIG. 1 which schematically depicts a cross-sectional view of a rocket motor which employs the controlled autoignition system of the present invention.

DETAILED DESCRIPTION OF THE INVENTION

The accompanying drawing FIG. 1 depicts in schematic fashion a cross-sectional view of a rocket motor 10 which embodies the present invention. In this regard, as is conventional, the rocket motor includes an elongate, motor casing 12 (typically formed of a graphite-epoxy material) which has a generally tubular section between its forward and rearward ends so as to define a generally cylindrical interior space having a substantially circular cross-sectional configuration. The rear end of the motor casing 12 is closed by a rearward directed nozzle assembly 14. A solid main propellant is contained within the motor casing interior in a manner well known to those skilled in the art. In accordance with the present invention, a relatively narrow strip or ring of a secondary propellant 16 in contact with the main propellant 18, most preferably at about midway of the motor casing 12.

The main propellant 18 is most preferably a conventional ammonium perchlorate (AP) based propellant which includes an inert binder HTPB, and optionally aluminum powder. In this regard, the AP will be present in the main propellant 18 in an amount between about 65-92 wt. % while the binder is present in amounts between about 8 to about 25 wt. %, based on the total weight of the main propellant composition. If present, the aluminum powder will typically be employed in amounts ranging from about 5 to about 20 wt. %, based on the total weight of the main propellant composition, in which case the AP is present in amounts preferably ranging from about 70 to about 85 wt. % with binder being employed as the balance of the composition weight.

The secondary propellant strip 16 is most preferably in the form of a compressed mass of a powdered composition containing (i) at least one nitramine selected from nitroguanidine (NQ), cyclotrimethylenetrinitramine (RDX), and cyclotetramethylenetetranitramine (HMX), and (ii) a binder system selected from at least one of hydroxyl-terminated polybutadiene (HTPB), HTPE and glycidyl azide polymer (GAP). Most preferably, the nitramine will be present in the secondary propellant in an amount between about 50 to about 95 wt. %, and more preferably in an amount between about 65 to about 90 wt. %, and sometimes in amounts ranging from about 65 wt. % to about 75 wt. %, based on the total weight of the secondary propellant composition. In such compositions, the binder will be present as the balance of the composition, that is, typically between about 5 to about 50 wt. %, preferably between about 10 to about 35 wt. %, and sometimes between about 25 to about 35 wt. %, based on the total weight of the secondary propellant composition.

Most preferably, the secondary propellant will include a combination of nitramines which includes NQ and one of RDX or HMX. In such preferred formulations, NQ will be present in the secondary propellant formulations in amount between about 30 to about 55 wt. %, and preferably between about 35 wt. % to about 50 wt. %, based on the total weight of the secondary propellant composition. The HMX or RDX components in such preferred formulations will be present in an amount ranging from 25 to about 50 wt. %, and preferably between about 30 to about 40 wt. %, based on the total weight of the secondary propellant composition. Especially preferred formulations in accordance with the present invention are shown below:

| Formulation A: | Component | Amt. (wt. %) |
|---|---|---|
| | NQ | 40-50 |
| | HMX | 35-40 |
| | HTPB | Balance |

| Formulation B: | Component | Amt. (wt. %) |
|---|---|---|
| | NQ | 35-40 |
| | HMX | 30-35 |
| | GAP | Balance |

The present invention will be further described by reference to the following non-limiting Examples.

EXAMPLES

Example 1 (Comparative)

A composite case measuring 5 inches by 10 inches long and being approximately 0.1 inch thick was loaded with a high energy composite propellant containing ammonium perchlorate, aluminum, HMX in a hydroxyl-terminated polybutadiene binder and having a 1-inch cylindrical bore. The loaded case was then subjected to slow cook-off testing at a temperature rise rate of 6° F. per hour. The motor exploded in a violent reaction 44 hours after the test was begun, and at a bore temperature of 380° F. The test hardware and oven were destroyed, and only tiny shred vestiges remained of the motor case.

Example 2 (Invention)

Example 1 was repeated except that a 1-inch wide×.0.1 inch thick mitigation strip of AFX-960 (HMX, nitroguanidine and HTPB) was placed between the motor case and the high-energy propellant. In the slow cook-off testing that ensued, the test item reacted at 35.7 hours after the test was begun and at a temperature of 297° F., yielding a burning-only type of reaction. The oven was opened and most of the metal test hardware was reusable. The case split into two major parts at the location of the mitigation strip.

Example 3 (Invention)

Example 2 was repeated except that GAP-960 (HMX, nitroguanidine and GAP binder) was employed for the mitigation strip. Identical results to those obtained in Example 2 were obtained.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A solid rocket motor propellant system comprising:
 (a) an ammonium perchlorate-based main propellant which comprises, based on the total weight of the main propellant, between about 65 to about 92 wt. % ammonium perchlorate (AP), between about 8 to about 25 wt. % of an inert binder, and optionally, between about 5 to about 20 wt. % of aluminum powder; and
 (b) a secondary propellant in the form of a strip in localized contact with said main propellant of a compressed mass of a composition which comprises, based on the total weight of the secondary propellant,
  (i) between about 50 to about 95 wt. % of at least one nitramine selected from the group consisting of nitroguanidine (NQ), cyclotrimethylenetrinitramine (RDX) and cyclotetramethylenetetranitramine (HMX), and
  (ii) between about 5 to about 50 wt. % of at least one binder selected from the group consisting of hydroxyl-terminated polybutadiene (HTPB) and glycidyl azide polymer (GAP), wherein said at least one nitramine and said at least one binder being present in amounts sufficient for the secondary propellant to exhibit an autoignition temperature which is at least about 100° C. lower than the autoignition temperature of the main propellant.

2. The propellant system of claim 1, wherein said secondary propellant comprises said nitroguanidine (NQ) and at least one additional nitramine which is said cyclotrimethylenetrinitramine (RDX) or said cyclotetramethylene tetranitramine (HMX).

3. The propellant system of claim 1, wherein said at least one binder is present in an amount between about 10 to about 35 wt. %.

4. A solid rocket motor propellant system comprising:
 (a) an ammonium perchlorate-based main propellant which comprises, based on the total weight of the main propellant, between about 65 to about 92 wt. % ammonium perchlorate (AP), between about 8 to about 25 wt. % of an inert binder, and optionally, between about 5 to about 20 wt. % of aluminum powder; and
 (b) a secondary propellant in localized contact with said main propellant having an autoignition temperature which is at least 100° C. lower than the autoignition temperature of the main propellant, said secondary propellant being in the form of a strip of a compressed mass of a powdered composition which comprises, based on the total weight of the secondary propellant;
  (i) between about 30 to about 55 wt. % of nitroguanidine (NQ);
  (ii) between about 25 to about 50 wt. % of at least one additional nitramine selected from the group consisting of cyclotrimethylenetrinitramine (RDX) and cyclotetramethylene tetranitramine (HMX), and
  (iii) between about 5 to about 50 wt. % of a binder which is at least one selected from the group consisting of hydroxyl-terminated polybutadiene (HTPB) and glycidyl azide polymer (GAP).

5. The propellant system as in claim 4, wherein said secondary propellant consists essentially of said NQ in an amount between about 40 to about 50 wt. %, and said HMX in an amount between about 35 to about 40 wt. %, with the balance being said HTPB.

6. The propellant system as in claim 4, wherein said secondary propellant consists essentially of said NQ in an amount between about 35 to about 40 wt. %, and said HMX in an amount between about 30 to about 35 wt. %, with the balance being said GAP.

7. The propellant system as in claim 1 or 4, wherein said secondary propellant is in the form of a ring of said compressed mass of said composition in localized contact with said main propellant.

* * * * *